Patented Mar. 29, 1932

1,851,726

UNITED STATES PATENT OFFICE

MATHIAS PIER, OF HEIDELBERG, AND WILHELM PUNGS AND RUDOLF WIETZEL, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF LIQUID HYDROCARBONS

No Drawing. Application filed September 13, 1927, Serial No. 219,362, and in Germany September 22, 1924.

We have found that liquid hydrocarbons, especially such as belong to the benzene series, are obtained by passing methane or ethane or mixtures of both together with substantial amounts of unsaturated hydrocarbons, especially olefines, or of the higher homologues of the paraffin series containing 3 or more carbon atoms in the molecule and which are gaseous under the conditions of working over catalysts at elevated temperatures, preferably between 500 and 900° C. The gas mixtures to be employed may also contain free hydrogen, but preferably its quantity should not be large. Generally speaking, the gas mixture should be so composed that the ratio of carbon combined with hydrogen to free and combined hydrogen is greater than the ratio of these elements in methane. However, the highest content of hydrogen allowable without the yield being diminished depends also on the composition of the gas mixture and the other conditions of working.

The process according to this invention may be carried out under ordinary pressure. Particularly good yields, however, are obtained when working under elevated pressure, and such pressure may be as high as 50 or 300 or 1000 atmospheres or even more.

The catalysts to be employed in the process here described are such comprising compounds of magnesium and/or glucinum, for example carbonates or other salts or hydroxids or oxids thereof, if desired in admixture with compounds of selenium, tellurium or thallium, or active silica or active charcoal or mixtures of these substances with each other or with other materials.

For example, very good results are obtained with magnesium carbonate, glucinum oxid.

It is very advantageous to employ for the reaction the gases or vapors resulting from the distillation or decomposition of coal, tars or mineral oils, which gases or vapors are rich in olefines. The gases or vapors may be passed directly over the contact mass effecting condensation or they may be previously subjected to a suitable treatment with a view to remove certain components for example to remove carbon dioxid by treatment with alkalis, or to add certain hydrocarbons or to pass the gas mixture first over a preliminary contact mass, for example such of a dehydrogenating character, at a temperature equal to or higher or lower than that employed for the reaction. Gases rich in ethane or its homologues are suitable for the present process and it may be found desirable to subject them to a two-stage treatment by first passing them at an elevated temperature over a catalyst for converting said saturated hydrocarbons into ethylene or other olefines whereupon the gas is rapidly cooled, if so preferred, and then passed over a catalyst especially adapted to effect the conversion into benzene hydrocarbons. In some cases, any carbon monoxid present in the gases also reacts with hydrocarbons of the paraffin series with the formation of liquid products and its may be advantageous to mix the reacting gases with carbon monoxid.

The following example will further illustrate how our invention may be carried out in practice, but the invention is not limited to this example.

Example

A gas resulting from the low temperature carbonization of coal and containing about 6.3 per cent, by volume, of carbon dioxid, 12.6 per cent of so-called heavy hydrocarbons of the general formula $C_nH_{2n+2}$, $n$ being 3 or more, 4.6 per cent of carbon monoxid, 11.2 per cent of hydrogen, 53.4 per cent of methane and 11.9 per cent of nitrogen is passed directly or after removing the carbon dioxid at between 600 and 700° C. through a quartz or porcelain tube filled with granulated magnesite. On cooling the gas leaving the furnace a liquid is obtained between about 40 and 45 per cent of which consist of crude benzol.

Instead of the said low temperature carbonization gas for example an oil gas containing 40 per cent of methane, 27 per cent of hydrogen and 33 per cent of heavier hydrocarbons of the general formula $C_nH_{2n+2}$, $n$ being 3 or more may be employed. The yield is often considerably increased by the presence or addition of small quantities of acetylene.

We claim:

1. The process of producing liquid hydrocarbons, which comprises passing a saturated hydrocarbon containing not more than 2 carbon atoms in the molecule in mixture with substantial amounts of hydrocarbons which are gaseous under the conditions of the process from the group consisting of unsaturated aliphatic hydrocarbons and higher saturated paraffin hydrocarbons containing more than 2 carbon atoms in the molecule over a catalyst of non-metallic character containing a substance from the group consisting of compounds of magnesium and glucinum at temperatures ranging between 500° and 900° C.

2. The process of producing liquid hydrocarbons, which comprises passing a saturated hydrocarbon containing not more than 2 carbon atoms in the molecule in mixture with substantial amounts of hydrocarbons which are gaseous under the conditions of the process from the group consisting of unsaturated aliphatic hydrocarbons and higher saturated paraffin hydrocarbons containing more than 2 carbon atoms in the molecule over a catalyst of non-metallic character containing a substance from the group consisting of compounds of magnesium and glucinum at temperatures ranging between 500° and 900° C. under a pressure in excess of 50 atmospheres.

3. The process of producing liquid hydrocarbons, which comprises passing a saturated hydrocarbon containing not more than 2 carbon atoms in the molecule in mixture with substantial amounts of hydrocarbons which are gaseous under the conditions of the process from the group consisting of unsaturated aliphatic hydrocarbons and higher saturated paraffin hydrocarbons containing more than 2 carbon atoms in the molecule over a catalyst of non-metallic character containing a substance from the group consisting of compounds of magnesium and glucinum at temperatures ranging between 500° and 900° C. and under pressures higher than atmospheric pressure.

4. The process of producing liquid hydrocarbons, which comprises passing a saturated hydrocarbon containing not more than 2 carbon atoms in the molecule in mixture with substantial amounts of hydrocarbons which are gaseous under the conditions of the process from the group consisting of unsaturated aliphatic hydrocarbons and higher saturated paraffin hydrocarbons containing more than 2 carbon atoms in the molecule with hydrogen over a catalyst of non-metallic character containing a substance from the group consisting of compounds of magnesium and glucinum at temperatures ranging between 500° and 900° C., the proportions of the gases being so chosen that the ratio of carbon combined with hydrogen to free and combined hydrogen is greater than in methane.

5. The process of producing liquid hydrocarbons, which comprises passing a mixture of methane, ethylene, ethane and propane and higher homologues at a temperature of between about 500° and 900° C. over a catalyst of non-metallic character containing a substance from the group consisting of compounds of magnesium and glucinum.

6. The process of producing liquid hydrocarbons, which comprises passing a saturated hydrocarbon containing not more than 2 carbon atoms in the molecule in mixture with substantial amounts of hydrocarbons, which are gaseous under the conditions of the process, from the group consisting of unsaturated aliphatic hydrocarbons and higher saturated paraffin hydrocarbons containing more than 2 carbon atoms in the molecule over a non-metallic catalyst comprising a substance from the group consisting of compounds of magnesium and glucinum at temperatures ranging between 500° and 900° C., the proportions of the gases being so chosen that the ratio of carbon combined with hydrogen to free and combined hydrogen is greater than in methane.

7. The process of producing liquid hydrocarbons, which comprises passing a saturated hydrocarbon containing not more than 2 carbon atoms in the molecule in mixture with substantial amounts of hydrocarbons, which are gaseous under the conditions of the process, from the group consisting of unsaturated aliphatic hydrocarbons and higher saturated paraffin hydrocarbons containing more than 2 carbon atoms in the molecule over a non-metallic catalyst comprising a substance from the group consisting of oxids and hydroxids of magnesium at temperatures of between 500° and 900° C., the proportions of the gases being so chosen that the ratio of carbon combined with hydrogen to free and combined hydrogen is greater than in methane.

8. The process of producing liquid hydrocarbons, which comprises passing a saturated hydrocarbon containing not more than 2 carbon atoms in the molecule in mixture with substantial amounts of hydrocarbons which are gaseous under the conditions of the process from the group consisting of unsaturated aliphatic hydrocarbons and higher saturated paraffin hydrocarbons containing more than 2 carbon atoms in the molecule over a catalyst of non-metallic character containing a substance from the group consisting of compounds of magnesium and glucinum at temperatures ranging between 500° C. and 900° C. and under a pressure between 50 and 1000 atmospheres.

9. The process of producing liquid hydrocarbons, which comprises passing a saturated hydrocarbon containing not more than 2 carbon atoms in the molecule in mixture with substantial amounts of hydrocarbons which are gaseous under the conditions of the process, from the group consisting of unsaturated aliphatic hydrocarbons and higher saturated paraffin hydrocarbons containing more than 2 carbon atoms in the molecule over a non-metallic catalyst comprising an oxid of magnesium at temperatures of between 500° and 900° C. and under pressures of between 50 and 1000 atmospheres, the proportions of the gases being so chosen that the ratio of carbon combined with hydrogen to free and combined hydrogen is greater than in methane.

In testimony whereof we have hereunto set our hands.

MATHIAS PIER.
WILHELM PUNGS.
RUDOLF WIETZEL.